3,023,105
STABILIZATION OF ANIMAL AND POULTRY
FEED CONTAINING CHLORTETRACYCLINE
Sidney Dayton Upham, Trenton, and Irving Klothen, Princeton, N.J., assignors to American Cyanamid Company, New York, N.Y., a corporation of Maine
No Drawing. Filed May 10, 1960, Ser. No. 28,012
6 Claims. (Cl. 99—2)

This invention relates to the stabilization of animal and poultry feed containing chlortetracycline and more particularly is concerned with a novel process of preparing animal feeds or animal feed supplements which are stable upon prolonged storage against loss of antibiotic potency.

In recent years the use of antibiotics in animal feeds for improving growth characteristics and efficiency of feed utilization has become of considerable economic importance. One of the best of such procedures is described in the United States Patent to Jukes No. 2,619,420 which involves the addition to animal feeds of the antibiotics produced by fermentation of an aqueous nutrient medium with the microorganism Streptomyces aureofaciens. In practice, the fermentation mash solids are harvested, after the fermentation has been continued for the requisite length of time, and dried. The dried harvest mash containing the antibiotics produced by the microorganism Streptomyces aureofaciens can be used as an animal feed supplement or may be blended with conventional animal feed materials to produce a nutritionally-balanced growth accelerating animal feed.

The use of the dried chlortetracycline-containing fermentation harvest mash solids as an animal or poultry feed supplement has from the beginning presented very vexing problems particularly the loss of potency of the antibiotic in the feed or feed supplement upon prolonged storage. This loss of antibiotic potency, and which frequently runs as high as 20% over a one-year storage period, has heretofore necessitated the addition of a suitable coverage of dried harvest mash antibiotic-containing solids to the animal feed blend so as to maintain the antibiotic potency during storage. Such a procedure is unsatisfactory and among other things results in higher than desired manufacturing costs for these animal feed supplements.

The present invention is based upon the surprising discovery that the biological inactive antibiotic 7-chloro-4-epi-tetracycline has the remarkable ability to stabilize the harvest mash solids to a considerable degree against loss in antibiotic potency over extended periods of time. The mechanism by which the feed supplements or animal feeds are stabilized by the addition of the inactive epimer is not known with any degree of certainty but it is believed that the epimer is gradually converted to the biologically active chlortetracycline, thus offsetting the loss of chlortetracycline potency which occurs by its possible conversion to the inactive epimeric form or possibly by its destruction to biologically inactive breakdown products. Thus, the present invention provides considerable economic advantage as no longer is it necessary to use the considerable amount of the expensive biologically active antibiotic to offset storage losses and yet the desired result of maintaining the antibiotic potency of the feed material at a fairly constant level is surprisingly achieved.

The epimer may be produced by the procedure described by Doerschuk et al., J.A.C.S. 77, 4687 (1955) or as described by McCormick et al., J.A.C.S. 79, 2849 (1957). The amount of epimer that has been found to be useful ranges from about 20% to 80% by weight of the active chlortetracycline contained in the feed or feed supplement.

The chlortetracycline may be added to the poultry feed as the hydrochloride crystals in amounts ranging from about 5 grams to about 200 grams per ton of feed.

More preferably, a feed supplement consisting essentially of harvest mash dried fermentation solids containing about 1–50 grams of chlortetracycline per pound may be blended with conventional poultry feed materials. The desired stability of the resulting feed is obtained in both instances when the epimer is present.

A commercial poultry feed containing 20% crude protein, 4% crude fat and 5% crude fiber was used in the following experiments. This was formulated of the following ingredients:

Riboflavin supplement
D activated animal sterol
Vitamin A feeding oil
Meat and bone scrap
Corn fermentation solubles
Fish meal
Soybean oil meal
Dehydrated alfalfa meal
Corn meal
Wheat standard middlings
Feeding cane molasses
Low fluorine rock phosphate, 2%
Calcium carbonate, 2%
Manganese sulfate, .0125%
Iodized salt, .5%
Calcium pantothenate
Niacin
Animal fat (preserved with butylated hydroxyanisole)

The invention will be described in greater detail in conjunction with the following specific example.

EXAMPLE 1

Chlortetracycline hydrochloride crystals in the amounts specified below were used in a poultry feed of the above composition in a series of experiments to determine antibiotic potencies after storage for varying periods of time. 7-chloro-4-epi-tetracycline in the amounts specified below was added to certain of the batches to prevent loss in antibiotic potency. The results obtained are shown in the table below.

Table

| Composition | Percent moisture | Average initial assay (microbiological) | Antibiotic recovery after storage as percent of initial assay ||||||
|---|---|---|---|---|---|---|---|---|
| | | | 23° C. || 37° C. || 56° C. ||
| | | | 1 wk. | 4 wks. | 1 wk. | 4 wks. | 1 wk. | 4 wks. |
| Poultry feed CTC.HCl crystals, 200 grams/ton | 13.0 | 207.0 | 91.5 | 81.0 | 81.5 | 59.0 | 30.0 | 6.4 |
| Do | 16.6 | 198.0 | 95.0 | 76.5 | 67.5 | 34.0 | 9.6 | 2.1 |
| Poultry feed with blended crystals (200 gms./ton CTC.HCl, 200 gms./ton CTC epimer) | 12.8 | 199.0 | 110.0 | 111.0 | 98.5 | 100.5 | 72.5 | 60.5 |
| Poultry feed with blended crystals (200 gms./ton CTC.HCl, 200 gms./ton CTC epimer) | 16.7 | 187.0 | 103.0 | 123.0 | 100.0 | 80.5 | 58.0 | 35 |

| Composition | Percent moisture | Average initial assay (microbiological) | 23° C. |||||||| 56° C. ||||||||
|---|---|---|---|---|---|---|---|---|---|---|---|---|---|---|---|---|---|
| | | | 1D | 2D | 3D | 4D | 7D | 14D | 21D | 28D | 1D | 2D | 3D | 4D | 7D | 14D | 21D | 28D |
| 2 gm. CTC.HCl/lb. soybean feed | 10.7 | 1.8 | 100 | 94.5 | 97 | 105 | 100 | 97 | 100 | 100 | 105 | 100 | 100 | 102.5 | 100 | 97 | 100 | 108 |
| 1 gm. CTC.HCl/1 gm. of CTC.HCl epimer/lb. soybean feed | 10.7 | 0.9 | 105 | 111 | 111 | 127 | 111 | 122 | 105 | 139 | 110 | 122 | 139 | 155 | 139 | 134 | 127 | 150 |

We claim:

1. An animal feed composition comprising an edible animal feedstuff containing the growth-promoting factors produced by elaboration of the microorganism *Streptomyces aureofaciens* and stabilized against loss of antibiotic potency by the addition of an effective amount of 7-chloro-4-epi-tetracycline.

2. An animal feed composition according to claim 1 in which the amount of epimer is from 20 to 80% by weight of the chlortetracycline.

3. An animal feed composition which comprises a nutritionally-balanced animal feed containing the growth-promoting factors produced by elaboration of the microorganism *Streptomyces aurefaciens* and stabilized against loss of antibiotic potency by the addition of an effective amount of 7-chloro-4-epi-tetracycline.

4. An animal feed composition according to claim 3 in which the amount of epimer is from 20 to 80% by weight of the chlortetracycline.

5. An animal feed composition which comprises a nutritionally-balanced animal feed containing chlortetracycline stabilized against loss of antibiotic potency by the addition of an effective amount of 7-chloro-4-epi-tetracycline.

6. An animal feed composition according to claim 5 in which the amount of epimer is from 20 to 80% by weight of the chlortetracycline.

References Cited in the file of this patent

Doerschuk et al.: J.A.C.S. 77 (1955), 4697.